United States Patent [19]

Sato

[11] Patent Number: 5,142,465

[45] Date of Patent: Aug. 25, 1992

[54] STROBE POPPING-UP APPARATUS

[75] Inventor: Masao Sato, Fujimi, Japan

[73] Assignee: Asahi Kogaku Kogyo Kabushiki Kaisha, Tokyo, Japan

[21] Appl. No.: 383,443

[22] Filed: Jul. 24, 1989

[30] Foreign Application Priority Data

Jul. 29, 1988 [JP] Japan .................. 63-100692[U]

[51] Int. Cl.⁵ ............................................. G03B 15/02
[52] U.S. Cl. ................................ 362/285; 362/3; 362/18; 362/287; 362/427; 354/149.11
[58] Field of Search .................... 362/3, 18, 285, 287, 362/418, 427; 354/413, 149.11, 145.1

[56] References Cited

U.S. PATENT DOCUMENTS

| 4,276,579 | 6/1981 | Yako | 362/18 |
| 4,471,410 | 9/1984 | Nakano | 362/287 |
| 4,516,191 | 5/1985 | Moriyama et al. | 362/285 |
| 4,545,661 | 10/1985 | Hamaguchi et al. | 354/149.11 |
| 4,768,134 | 8/1988 | Haydu et al. | 362/285 |
| 4,771,308 | 9/1988 | Tejima et al. | 354/403 |
| 4,821,155 | 4/1989 | Harting | 362/65 |
| 4,893,140 | 1/1990 | Yamamoto et al. | 354/149.11 |
| 4,910,542 | 3/1990 | Yamamoto et al. | 354/149.11 |
| 4,920,368 | 4/1990 | Arai et al. | 354/145.1 |

FOREIGN PATENT DOCUMENTS

| 0275089 | 7/1988 | European Pat. Off. | 354/149.11 |
| 3639751 | 5/1987 | Fed. Rep. of Germany . | |
| 0041640 | 2/1986 | Japan | 362/65 |
| 2183857 | 6/1987 | United Kingdom . | |

OTHER PUBLICATIONS

British Search Report 89-17084.9, Oct. 1989.
English abstract of German Patent No. 3,639,751.
French Search Report.

Primary Examiner—Ira S. Lazarus
Assistant Examiner—Sue Hagarman
Attorney, Agent, or Firm—Sandler, Greenblum & Bernstein

[57] ABSTRACT

A strobe pop-up apparatus in which a strobe body is moved between a retracted position and a projection position, includes rotational levers which are pivoted at one end to the sides of a front portion of the strobe body and which are pivoted at their opposite ends to supporting members, and a cam guide mechanism having cam grooves and pins fitted in the cam grooves, between the sides of a rear portion of the strobe body and the supporting members, for guiding the movement of the strobe body between the retracted position and the projected position in accordance with the rotation of the rotational lever. The cam grooves are provided, on their terminal ends adjacent to the projected position of the strobe body, with archwise cam groove portions which extend along a circle having a center on an imaginary line parallel with the rotational levers when located in the vicinity of the projected position and having a radius that is the same as the rotational movement of the rotational lever.

17 Claims, 5 Drawing Sheets

STROBE POPPING-UP APPARATUS

BACKGROUND OF THE INVENTION

1. Field of the Invention

The present invention relates to a strobe popping-up apparatus for moving a strobe body between a retracted position, in which the strobe is retracted into a camera body, and a projected position, in which the strobe is projected from the camera body.

2. Description of Related Art

Various known strobe popping-up apparatuses are known having a strobe body which is linearly movable, or is rotatable about a point, or is moved by a complex movement of more than one shaft, between a retracted position and a projected position. Among the first type of strobe popping-up apparatus having a linearly movable strobe body, there is no possibility of an accidental deviation of an optical axis of the strobe in the projected position. However, in the popping-up apparatuses having a rotatable strobe body or more than one shaft, an accidental deviation of the optical axis of the strobe (including an optical axis of an auxiliary projector, if any) from a design value takes place when the position after the popping-up is completed, i.e. the retracted position is slightly displaced, thus resulting in a deteriorated orientation characteristic (direction of illumination) of the strobe and a decreased efficiency of the auxiliary projector.

FIG. 5 shows a known strobe popping-up mechanism having two shafts. In FIG. 5, the strobe body 11 is provided, on the front and rear portions of the sides thereof, with two shafts 12 and 13 to which ends of front and rear rotational levers 14 and 15 are pivoted.

The opposite ends of the rotational levers 14 and 15 are pivoted to shafts 17 and 18 provided on a supporting member 16, respectively, so that the rotational movement of the rotational levers 14 and 15 about the shafts 17 and 18 causes the strobe body 11 to move between a retracted position and a projected position.

In the known apparatus shown in FIG. 5, the position of the strobe body 11 is determined, for example, by a stop 19 which restricts the rotational displacement of the rotational lever 15. However, if the stop 19 fails to be precisely positioned at a predetermined position (i.e. a designed position) with respect to the supporting member 16, as shown by a two-dot chain line 19' or a three-dot chain line 19" in FIG. 5, the strobe body 11 occupies different projected positions, as shown by a two-dot chain line 11' and a three-dot chain line 11" in FIG. 5. Numeral 11A designates a correct projected position of the strobe body 11.

One of the fatal problems of the prior art mentioned above is a deviation of the optical axis of the strobe body 11 an upward and downward direction, resulting in a deviation of the direction of the strobe illumination from a designed optical axis. Namely, the optical axes O' and O'' shown at two-dot chain line and three-dot chain line are largely deviated from the designed correct optical axis O, as shown in FIG. 5. To prevent this, it is necessary to precisely position the stop 19. However, this is troublesome. In particular, if a displacement of the position of the stop 19 of the strobe occurs after it is shipped a user, for example by wear, a photographer can neither recognize the displacement nor adjust it. As a result, a picture taken by a photographer has a wrong strobe orientation which does not match the picture plane.

SUMMARY OF THE INVENTION

The primary object of the present invention is to provide a strobe popping-up apparatus in which the optical axis of the strobe can be maintained in parallel with a designed correct optical axis, even if there is an error in positioning of the stop after the strobe is popped-up.

To achieve the object mentioned above, according to the present invention, there is provided a strobe popping-up apparatus in which a strobe body is moved between a retracted position and a projected position, comprising at least one rotational lever which is pivoted at one end to a side of the strobe body and which is pivoted at an opposite end a supporting member, and a cam guide mechanism having a cam groove and a pin fitted in the cam groove, between the side of a rear portion of the strobe body and the corresponding supporting member for guiding the movement of the strobe body between the retracted position and the projected position in accordance with the rotation of the rotational lever, the cam groove being provided, on their terminal end adjacent to the projected position of the strobe body, with an archwise cam groove portion which extends along a circle having a center on an imaginary line parallel with the rotational lever when located in the vicinity of the projected position and having a radius that is the same as the rotational movement of the rotational lever.

With this arrangement, when the strobe body is located in the projected position or the vicinity thereof, a parallel motion of the archwise cam groove portion of the cam groove of the cam guide mechanism and the strobe body takes place due to the rotation of the rotational lever. Therefore, even if there is a slight displacement of the stop position of the strobe body at the projected position, only a parallel motion of the optical axis of the strobe body occurs. Accordingly, no change in the orientation of the strobe body occurs.

In other words, one of the significant features of the present invention resides in the provision of the archwise cam groove section in which the strobe body is moved up and down in parallel by a parallel motion mechanism after the strobe body comes to the projected position. In this construction, no inclination of the optical axis of the strobe body occurs, regardless of the stop position of the strobe body as long as the strobe body is within the above-mentioned section.

BRIEF DESCRIPTION OF THE DRAWINGS

The invention will be described below in detail with reference to the accompanying drawings, in which.

DESCRIPTION OF PREFERRED EMBODIMENT

Figure 1:
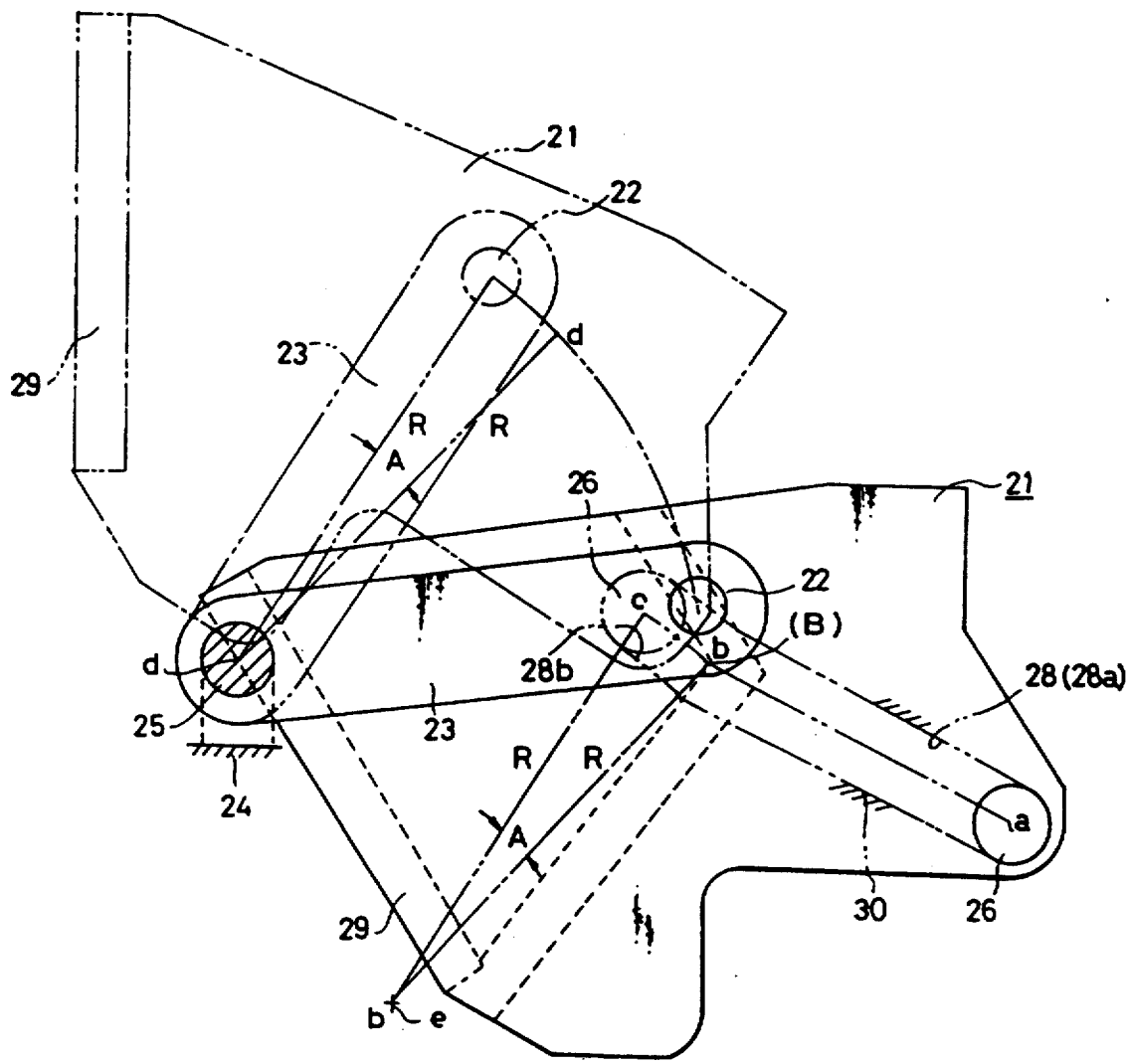
FIG. 1 is a side elevational view of a strobe popping-up apparatus according to an embodiment of the present invention.
Figure 2:
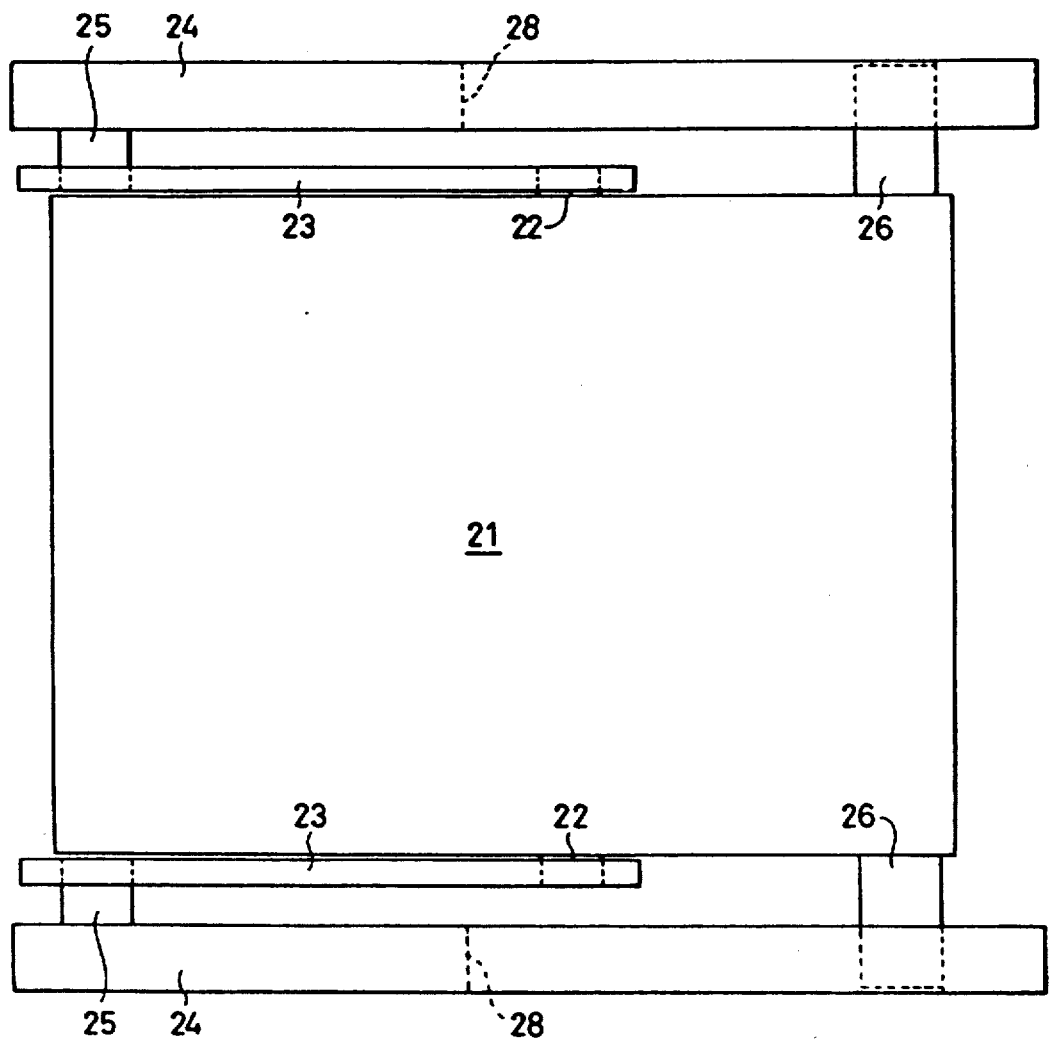
FIG. 2 is a plan view of FIG. 1.
Figure 5:
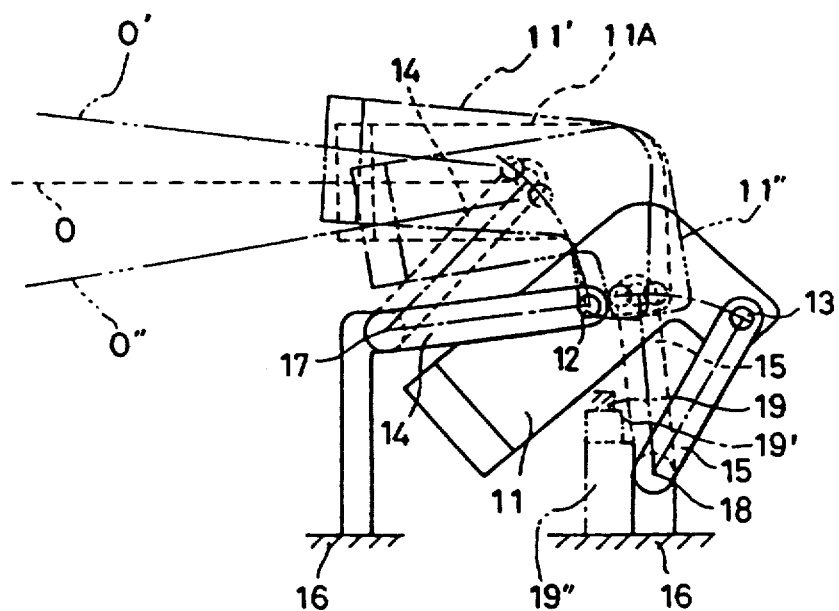
FIG. 5 is a side elevational view of a known strobe popping-up apparatus.

FIGS. 1 and 2 show a preferred embodiment of the present invention, in which strobe body 21 is provided on its side faces with rotational levers 23 which are rotatably connected thereto at one end through a pivot shaft 22 and which are connected at their opposite ends to a pivot shaft 25 provided on supporting members 24 provided on the sides of the strobe body. The rotational levers 23 extend substantially in a horizontal direction in the retracted position of the strobe body 21 and extends in an inclined direction in the projected position of the strobe body 21, as shown by a two-dot chain line in FIG. 1. The rotational levers 23 are substantially similar to the conventional rotational levers 14 shown in FIG. 5.

The strobe body 21 includes posture control pins 26 at a rear portion thereof, which laterally project from the strobe body 21. The supporting members 24 have cam grooves 28, in which the posture control pins 26 are fitted. Each cam groove 28 has a linear guide groove portion 28a which extends from a point a to a point b so that a light emitting plane 29 (Fresnel lens) of the strobe body 21 gradually direct upwardly when pins 29 move from point a to b, and an archwise cam groove portion 28b which extends from the point b to a point c and which is connected to a terminal end of the linear guide groove portion 28a. The archwise cam groove portion 28b describes a part of a circle of radius R having an imaginary center on a point e which is located at one end of a line segment b—b which is identical to and parallel with a line segment d—d identical to a distance between the centers of the shafts 22 and 25 when the rotational lever 23 is in the projected position or in the vicinity thereof.

The linear guide groove portions 28a are shaped so that when the posture control pins 26 come to connection points B between the archwise cam groove portions 28b and the linear cam groove portions 28a, light emitting plane 29 (the optical axis of the strobe body 21) is orientated at a desired direction. The linear cam groove portions 28a can be replaced with curved cam groove portions.

It is known to provide an auxiliary projector which projects a contrast pattern onto an object having a low contrast, on the strobe (e.g. U.S. Pat. No. 4,771,308, U.S. Ser. No. 120,650 etc.).

Figure 3:
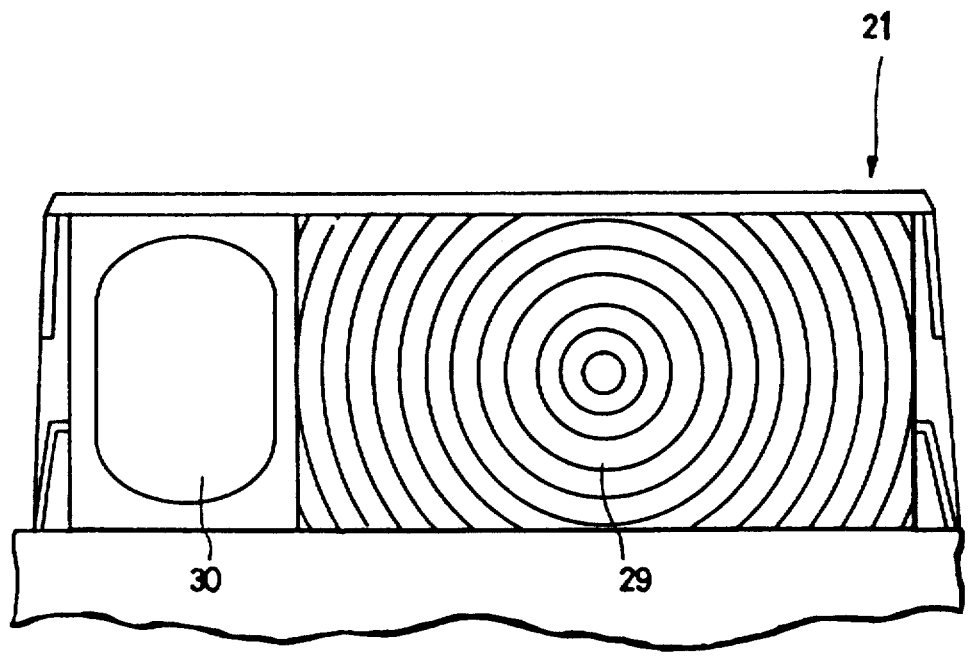
FIG. 3 is a front elevational view of a strobe body having an auxiliary projector.

FIG. 3 shows an embodiment in which the strobe body 21 has an auxiliary light emitter 30, in addition to the light emitting plane 29. In this arrangement, the optical axis of the light emitter 30 is adjusted in the same way as the light emitting plane 29. That is, the light emitter 30 is located so that when the posture control pins 26 come to the connection points B between the linear cam groove portions 28a and the archwise cam groove portions 28b, the optical axis of the light emitter 30 is orientated to a desired direction.

In the strobe popping-up apparatus as constructed above, when the strobe body 21 is brought from the retracted position into the projected position by rotating the rotational levers 23 in the counterclockwise direction in FIG. 1, the light emitting plane 29 is gradually inclined upward, while the posture control pins 26 are within the linear cam groove portions 28a of the associated cam grooves 28, so that the optical axis of the strobe body 21 is finally orientated to a desired direction. When the posture control pins 26 are brought into the archwise cam groove portions 28b, the strobe body 21 is moved up and down in such a way that the optical axis thereof has a parallel motion.

Namely, when the posture control pins 26 are within the archwise cam groove portions 28b, shaft 25, point e, shaft 22 and posture control pins 26 describe a parallelogram, as can be understood from the foregoing. The parallel motion mechanism of the parallelogram is maintained so long as the posture control pins 26 are moved in the archwise cam groove portions 28b (within an angle A in FIG. 1). Thus, the strobe body 21 moves up and down while moving the optical axis thereof in parallel motion so long as the posture control pins 26 move in the archwise cam groove portions 28b.

According to the strobe popping-up apparatus of the present invention, even if the projected position (stop position) of the strobe body 21 is accidentally displaced while the posture control pins 26 are located in the archwise cam groove portions 28b of the associated cam grooves 28, no inclination of the optical axis of the strobe body 21 takes place. That is, since only a parallel motion of the strobe body 21 occurs, no orientation characteristics of the strobe body can be deteriorated.

Figure 4:
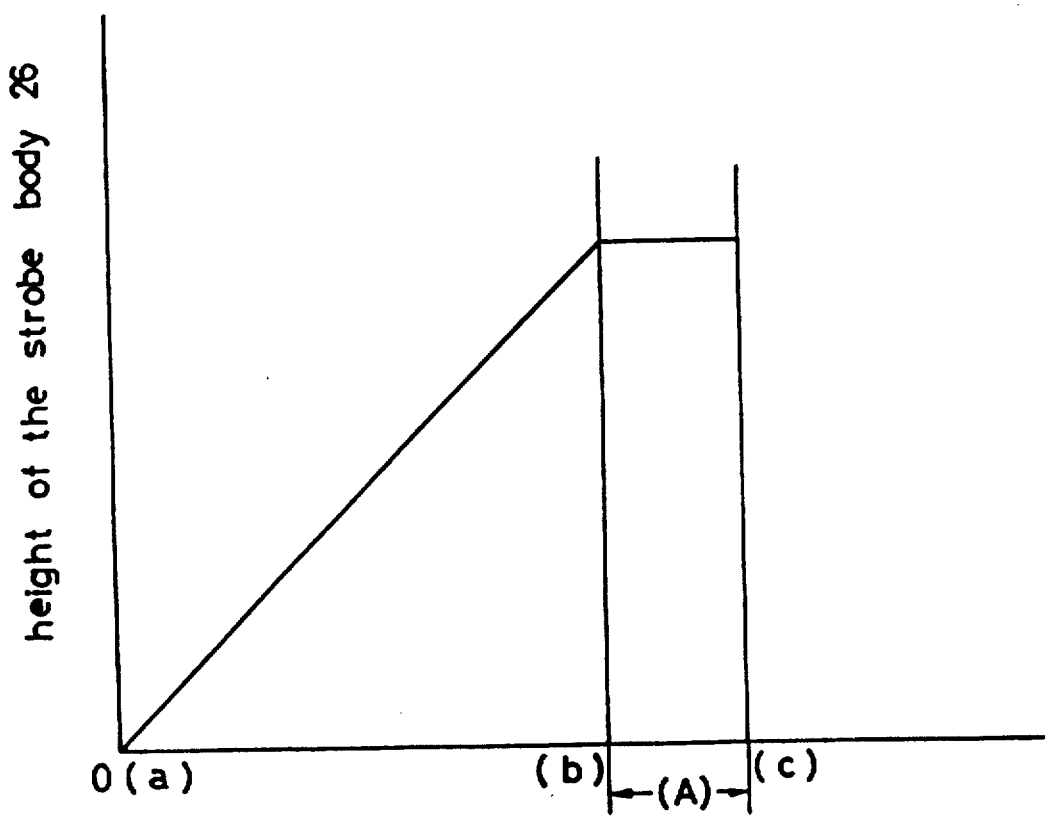
FIG. 4 is a diagram showing a relationship between the rotation angle of rotational levers and the high of the strobe body.

FIG. 4 shows a relationship between the rotation angle of the rotational levers 23 and the height of the strobe body 21. As can be seen from FIG. 4, the strobe body 21 linealy moves upward while the posture control pins 26 moves within the linear come groove portions 28a (from point a to b). However, the strobe body 21 does not move in the height direction of a camera (upwardly or downwardly) while the posture control pins 26 move within the archwise cam groove portions 28b (from point b to c) after the rotational levers 23 comes to the projected position B.

The above discussion can be applied to an embodiment in which the auxiliary projector is provided on the strobe body 21. Namely, the displacement of the projected position (stop position) of the strobe body 21 causes only a parallel motion of the optical axis of the auxiliary projector, so long as the posture control pins 26 are located in the archwise cam groove portions 28b of the associated cam grooves 28. In other words, no change of the direction of the light emitting plane 29 (and 30) occurs when the stop position (projected position) of the strobe body 21 is set to be located within the section corresponding to the angle A in which the archwise cam groove portions 28b exist.

In the illustrated embodiment, the posture control pins 26 are provided on the sides of the strobe body 21 and the cam grooves are provided on the supporting members 24. Alternatively, it is also possible to provide the cam grooves on the sides of the strobe body 21 and provide the posture control pins on the supporting member 24, so that the posture control pins are fitted in the corresponding cam grooves, contrary to the illustrated embodiment.

As can be seen from the above description, the strobe body can be moved in parallel in the vicinity of the retracted position thereof. As a result, even if a slight displacement of the stop position (projected position) of the strobe body takes place, no inclination of the optical axis of the strobe occurs, thus resulting in a prevention of the deviation (inclination) of the strobe illumination direction. Furthermore, according to the present invention, since the rear portion of the strobe body is guided by the cam grooves, the track of the popping-up motion can be optionally set.

I claim:

1. A strobe pop-up apparatus in which a strobe body is moved between a retracted position and a projected position, comprising at least one rotational lever which is pivoted at one end to a side of the strobe body and which is pivoted at an opposite end to a supporting member, and a cam guide mechanism having a cam groove and a pin fitted in said associated cam groove, between the side of a rear portion of said strobe body and a corresponding supporting member for guiding the movement of said strobe body between said retracted position and said projected position in accordance with the rotation of said rotational lever, said cam groove being provided, on their terminal ends adjacent to said projected position of the strobe body, with an archwise cam groove portion which extends along a circle having a center on an imaginary line parallel with said rotational lever when located in the vicinity of said projected position and having a radius that is the same as the rotational movement of said rotational lever.

2. A strobe pop-up apparatus according to claim 1, wherein said pin and said cam groove of said cam guide mechanism are provided on both sides of said strobe body and said supporting members, corresponding to both sides of said strobe body.

3. A strobe pop-up apparatus according to claim 2, wherein said pins provided on said sides of the strobe body laterally project therefrom.

4. A strobe pop-up apparatus according to claim 1, wherein said strobe body has a light emitting plane and an auxiliary projector which projects a contrast pattern onto an object to be photographed.

5. A strobe pop-up apparatus according to claim 1, wherein said rotational lever, said pin and said cam grooves of said cam guide mechanism are located in a symmetrical arrangement on opposite sides of said strobe body.

6. A strobe pop-up apparatus in which a strobe body is moved between a retracted position and a projected position, with respect to supporting members supporting said strobe body, comprising a parallel motion mechanism which moves said strobe body in parallel after said strobe body comes to the projected position and a non-parallel motion mechanism which defines a movement track of said strobe body from said retracted position to said projected position.

7. A strobe popping-up apparatus according to claim 6, wherein said parallel motion mechanism comprises rotational levers which are pivoted at their one end to the sides of the strobe body and at their opposite ends to the supporting members, posture control pins provided on the sides of the strobe body, and archwise cam grooves which are formed on the supporting members, so that the associated pins are fitted in the associated archwise cam grooves.

8. A strobe popping-up apparatus according to claim 6, further comprising linear cam guide portions connected to the associated archwise cam grooves, so that the posture control pins can be fitted in the associated linear cam groove portions.

9. A strobe popping-up apparatus according to claim 8, wherein said non-parallel motion mechanism is composed of said rotational levers and said linear guide groove portions.

10. A strobe pop-up apparatus according to claim 8, wherein said strobe body when being brought to the projected position is stopped at a position which is set in the track of the movement of the strobe body by the parallel motion mechanism.

11. A strobe pop-up apparatus in which a strobe body is moved between a retracted position and a projection position, comprising at least one rotational lever which is pivoted at one end to a side of a front portion of said strobe body and which is pivoted at an opposite end to a supporting member, a cam guide mechanism having a non-linear cam groove and a pin fitted in said non-linear cam groove, between a side of a rear portion of said strobe body and a corresponding supporting member for guiding a non-parallel movement of said strobe body between said retracted position and said projected position in accordance with the rotation of said rotational lever, and a parallel moving mechanism that moves said strobe body in parallel after said strobe body is moved to said projected position, said cam guide mechanism being provided to stop the movement of said strobe body in a height direction after said rotational lever comes to a predetermined projected position.

12. A strobe pop-up apparatus, comprising:
a strobe body;
a camera body;
a support member for rotatably pivoting said strobe body between a first, retracted position and a second, projected position, said support member being pivotally attached to said camera body and strobe body; and
means for controlling the posture of said strobe body as it moves between said first and second positions, wherein said support member comprises a parallel motion mechanism which moves said strobe body in parallel after said strobe body comes to said second position and a non-parallel motion mechanism which defines a movement track of said strobe body from said first position to said second position.

13. A strobe pop-up apparatus for moving a strobe body between a retracted position and a projected position, comprising:
a lever, one end of said lever being rotatably pivoted about a point of said strobe body, a second end of said lever being rotatably attached to a camera body;
a non-linear cam groove provided in either said camera body or strobe body;
a follower pin provided on the other of said camera body or strobe body that does not have said non-linear cam groove, said follower pin fitting into said non-linear cam groove, said lever following the contour of said non-linear cam groove when moving said strobe between said retracted position and said projected position and a parallel moving mechanism that moves said strobe body in parallel after said strobe body is moved to said projected position.

14. A strobe pop-up apparatus for moving a strobe body between a retracted position and a projected position, comprising:
a supporting member;
a lever having a first end that is pivoted proximate a side of said strobe body and a second end that is pivoted proximate said supporting member;
means for guiding a movement of said strobe body between said retracted position and said projected position in a non-linear travel path in response to a rotation of said lever, said guiding means stopping said movement of said strobe body when said lever pivots to a predetermined projected position; and
means for moving said strobe body in parallel after said strobe body comes to said predetermined projected position.

15. The strobe pop-up apparatus of claim 14, wherein said guiding means comprises a cam groove and a pin that fits in said cam groove.

16. The strobe pop-up apparatus of claim 14, wherein said lever and said guiding means are located in a symmetrical arrangement on opposite sides of said strobe body.

17. The strobe pop-up apparatus of claim 15, wherein said cam groove is provided with an archwise cam groove portion that extends along a circle having a center on an imaginary line that is parallel with said lever when located in a vicinity of said projected position and having a radius that is the same as a radius made by said movement of said lever.

* * * * *

UNITED STATES PATENT AND TRADEMARK OFFICE
CERTIFICATE OF CORRECTION

PATENT NO. : 5,142,465
DATED : August 25, 1992
INVENTOR(S) : M. SATO

It is certified that error appears in the above-indentified patent and that said Letters Patent is hereby corrected as shown below:

At column 5, lines 46-54 (claim 7 in its entirety), delete the claim and insert the following: ---7. A strobe pop-up apparatus according to claim 6, wherein said parallel motion mechanism comprises rotational levers which are pivoted at one end to sides of said strobe body and at their opposite ends to said supporting members in which posture control pins are provided on said sides of said strobe body, and archwise cam grooves are formed on said supporting members, so that said pins are fitted in said archwise cam grooves.---.

At column 5, line 55 (claim 8, line 1), change "popping-up" to ---pop-up---.

At column 5, line 57 (claim 8, line 3), change "the associated" ---said---.

At column 5, line 58 (claim 8, line 4), change "the" (first occurrence) to ---said---.

UNITED STATES PATENT AND TRADEMARK OFFICE
CERTIFICATE OF CORRECTION

PATENT NO. : 5,142,465
DATED : August 25, 1992
INVENTOR(S) : M. SATO

It is certified that error appears in the above-indentified patent and that said Letters Patent is hereby corrected as shown below:

At column 5, line 58 (claim 8, line 4), change "the associated" to ---said---.
At column 5, line 60 (claim 9, line 1), change "popping-up" to ---pop-up---.
At column 5, line 65 (claim 10, line 2), change "wherein said strobe body when being brought to the" to ---wherein when said strobe body is brought to said---.
At column 5, line 66 (claim 10, line 3), after "position" (first occurrence), insert ---, said strobe body---.
At column 5, line 67 (claim 10, line 4), change "the" (third and fourth occurrences) to ---said---.

Signed and Sealed this

Fourteenth Day of March, 1995

Attest:

BRUCE LEHMAN

*Attesting Officer*   *Commissioner of Patents and Trademarks*